(12) United States Patent
Vannuffelen

(10) Patent No.: US 6,606,915 B2
(45) Date of Patent: Aug. 19, 2003

(54) METHOD FOR MEASURING OSCILLATION FREQUENCY OF A FLUID JET IN A FLUIDIC OSCILLATOR

(75) Inventor: Stephane Vannuffelen, Paris (FR)

(73) Assignee: Actaris S.A.S. (FR)

( * ) Notice: Subject to any disclaimer, the term of this patent is extended or adjusted under 35 U.S.C. 154(b) by 0 days.

(21) Appl. No.: 10/111,990
(22) PCT Filed: Aug. 27, 2001
(86) PCT No.: PCT/FR01/02670
§ 371 (c)(1), (2), (4) Date: Aug. 20, 2002
(87) PCT Pub. No.: WO02/18885
PCT Pub. Date: Mar. 7, 2002

(65) Prior Publication Data
US 2003/0041673 A1 Mar. 6, 2003

(30) Foreign Application Priority Data
Sep. 1, 2000 (FR) .............................. 00-11257

(51) Int. Cl.⁷ ................................. G01F 1/32
(52) U.S. Cl. .................................. 73/861.22
(58) Field of Search ................ 73/861.21, 861.22, 73/861.19, 195, 204.26

(56) References Cited

U.S. PATENT DOCUMENTS 3,587,312 A    6/1971   McMurtrie et al.
3,706,227 A  * 12/1972  Gottron et al. ............. 374/118
4,467,984 A  *  8/1984  Tippetts .................... 244/78
5,339,695 A  *  8/1994  Kang et al. .............. 73/861.19
5,864,067 A    1/1999   Ligneul et al.
5,908,991 A    6/1999   Sasaki et al.

FOREIGN PATENT DOCUMENTS

DE    35 01 257 A    10/1985
GB    2 155 635 A     9/1985

* cited by examiner

Primary Examiner—Edward Lefkowitz
Assistant Examiner—Jewel V. Thompson
(74) Attorney, Agent, or Firm—Straub & Pokotylo; Michael P. Straub

(57) ABSTRACT

The oscillation frequency of a fluid jet in a fluidic oscillator is measured using a temperature sensor. The resistance of the temperature sensor varies as a function of the oscillation of frequency $f_0$ of the jet. The method consists in feeding the temperature sensor with an AC voltage of frequency $f$, and then in determining the frequency components around the frequency $3 \times f$ in the output signal from the temperature sensor in order to determine the oscillation frequency $f_0$ of the jet. The frequency components in the signal output by the temperature sensor are determined by measuring the measurement signal across the terminals of the temperature sensor, then by synchronously demodulating the measurement signal at the frequency $3 \times f$, and finally by determining the frequency of the demodulated measurement signal, which frequency corresponds to the oscillation frequency $f_0$ of the jet.

5 Claims, 5 Drawing Sheets

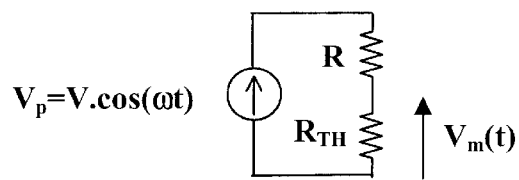
FIG.4
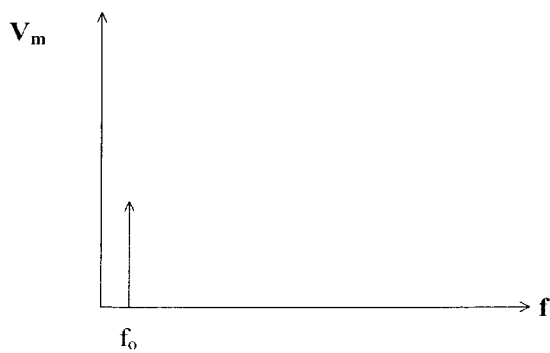
FIG.5.A
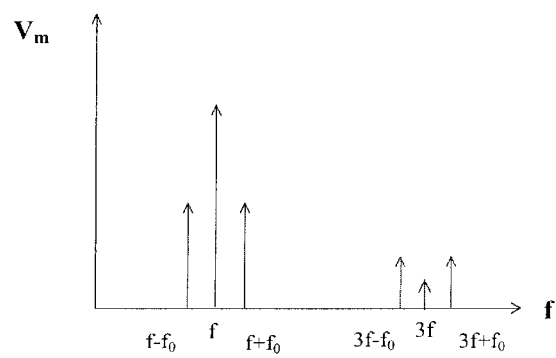
FIG.5.B

METHOD FOR MEASURING OSCILLATION FREQUENCY OF A FLUID JET IN A FLUIDIC OSCILLATOR

The invention relates to a method of measuring the oscillation frequency of a fluid jet in a fluidic oscillator using a temperature sensor whose temperature-dependent resistance varies as a function of the oscillation frequency of the jet.

Fluidic oscillators are well known to the person skilled in the art, and a particularly advantageous application thereof lies in the field of measuring a fluid flow rate, as described in document EP 0 882 951. A fluidic oscillator flowmeter 1, as shown in an exploded view in FIG. 1, comprises a flowmeter body made up of two side portions 2, 3 on either side of a central block 4 which includes a measurement unit 5.

On the inside, the side portion 2 defines a "upstream" chamber (not shown) into which the fluid penetrates after passing through an inlet opening (not shown).

This chamber has a wall (not shown) in which the admission opening is formed. This wall acts as a deflector wall and it receives the impact of the fluid flow coming from the opening, splitting the flow and deflecting it towards two orifices (only one orifice 6 is visible in FIG. 1) formed in the deflection wall. Two passages 7, 8 extend the orifices respectively and direct the fluid flow fractions so as to make them converge on the inlet 9 of the measurement unit 5. As a general rule, this inlet is in the form of an elongate slot.

The measurement unit 5 has an oscillation chamber 10 in which an obstacle 11 is positioned as shown by two arrows in FIG. 1 so as to face the inlet 9.

The fluid penetrating into the oscillation chamber and encountering the front portion of the obstacle 11 oscillates transversely relative to the direction A in a plane parallel to the wall 12 and flows alternately past one end and the other end of said obstacle so as to leave the oscillation chamber via the outlet 13 in the direction A. The inlet 9 and the outlet 13 of the oscillation chamber are in alignment on the direction A. The oscillation chamber 10 is defined firstly by the wall 12 and secondly by another wall 15 parallel to said wall 12.

The flowmeter is installed between two pipes via flange couplings included in the admission opening (not shown) and the exhaust opening 14.

The fluid which leaves the oscillation chamber takes the passage 16 which forms a bend so as to guide the fluid towards the exhaust opening 14.

The side portion 2 is made integrally with the central block 4 of the flowmeter body which includes the measurement unit 5. The other side portion 3 is manufactured separately and is subsequently fitted onto the central block so as to act as a cover.

A cavity 17 is formed in the wall 15 so as to allow at least one flow sensor to be installed therein, e.g. a temperature sensor whose function is to detect the oscillations of the fluid in the oscillation chamber 10. Thus, because of the existence of a proportionality relationship between the oscillation frequency of the fluid jet in the oscillation chamber and the flow rate of the fluid along the pipe, the value of the fluid flow rate can be deduced by measuring the oscillation frequency. The fluid jet sweeps over the temperature sensor, thereby modifying its temperature by heat exchange, and consequently measuring temperature variations of the sensor by measuring variations in its electrical resistance makes its possible to determine the oscillation frequency of the jet.

The flowmeter preferably has two temperature sensors placed in the cavity 17 between the obstacle 11 and the inlet 9, symmetrically on either side of the inlet 9.

A duct 18 pierced by a hole is provided in the body of the flowmeter to pass electrical connections between said body (and in particular its sensor(s)), and a counter for informing the user of parameters such as total consumption of fluid and fluid flow rate.

Respective heat exchanges between the temperature sensor and both the fluid and the body of the flowmeter are shown in FIG. 2.

The heat exchanges between the sensor and the oscillating fluid are described by the following equation:

$$\Phi_1 = K_1(T_{th} - T_g)$$

where:

$\Phi_1$ is the power dissipated towards the oscillating fluid;

$K_1$ is the thermal conductance between the sensor and the fluid;

$T_{th}$ is the temperature of the sensor; and $T_g$ is the temperature of the oscillating fluid.

It should be observed that the thermal conductance $K_1$ depends on the exchange area of the sensor, and on the thermal conductivity, the density, and the speed of the fluid. Consequently, when the fluid jet is oscillating, $K_1$ depends on time.

Heat exchanges between the sensor and the body of the fluidic oscillator via the structure of the sensor and its packaging are described by the following equation:

$$\Phi_2 = K_2(T_{th} - T_b)$$

where:

$\Phi_2$ is the power dissipated towards the body of the fluidic oscillator;

$K_2$ is the thermal conductance between the sensor and the body of the fluidic oscillator;

$K_{th}$ is the temperature of the sensor; and $T_b$ is the temperature of the body of the fluidic oscillator.

It should be observed that the thermal conductance $K_2$ is independent of fluid oscillations and consequently provides no information useful in determining the oscillation frequency.

The principle of conservation of energy leads to the following equation for describing the heat exchanges:

$$C \frac{dT_{th}}{dt} + K_1(t)(T_{th} - T_g) + K_2(T_{th} - T_b) = p(t)$$

where:

C is the heat capacity of the sensor; and p(t) is the instantaneous electrical power dissipated by the sensor.

It has been observed that for a sensor powered with DC, as is the case in prior art fluidic oscillator flowmeters, and under well-specified temperature conditions corresponding to the following:

$$T_g - T_b = \frac{V^2}{4K_2R_{th}},$$

where:

$R_{th}$ is the electrical resistance of the sensor, information concerning the angular frequency $\omega_0$ of the oscillating fluid jet is lost because $\delta T_{th}(t) = 0$.

Such temperature conditions can be encountered, for example, when a hot fluid penetrates into a cold flowmeter. FIG. 3 shows how the amplitude of the signal $V_m$ measured across the output terminals of the temperature sensor varies as a function of time t. It can be seen that under the above-specified temperature conditions, the signal diminishes until it reaches a value where it is no longer possible to measure the oscillation frequency of the jet.

An object of the present invention is to propose a method of measuring the oscillation frequency of a fluid jet in a fluidic oscillator using a temperature sensor, which method is insensitive to temperature conditions, and more particularly is insensitive to transient stages in which, for example, a hot fluid penetrates into a cold flowmeter.

According to the invention, this object is achieved by a method of measuring the oscillation frequency of a fluid jet in a fluidic oscillator using a temperature sensor whose resistance varies as a function of the oscillation frequency $f_0$ of the jet, said method consisting in:

feeding the temperature sensor with an AC voltage of frequency $f$; and determining the frequency components around the frequency $3 \times f$ in the signal output by the temperature sensor in order to determine the oscillation frequency $f_0$ of the jet.

In a preferred implementation of the method of the invention, the frequency components in the output signal from the temperature sensor are determined by using the following steps:

measuring the resulting measurement signal V(t) across the terminals of the temperature sensor;

synchronously demodulating the measurement signal at the frequency $3 \times f$; and determining the frequency of the demodulated measurement signal, which frequency corresponds to the oscillation frequency $f_0$ of the jet.

The step of synchronously demodulating the measurement signal at the frequency $3 \times f$ is preferably performed by multiplying the measurement signal V(t) by $\cos(3 \times 2\pi \times f \times t)$.

Other advantages and characteristics of the invention appear on reading the following description made by way of example and with reference to the accompanying drawings, in which:

FIG. 4 is a diagram showing the circuit for biasing the temperature sensor in the form of half a Wheatstone bridge;

FIGS. 5A and 5B show the frequency components of the output signal from the temperature sensor when it is fed with DC and with AC respectively;

Figure 1:
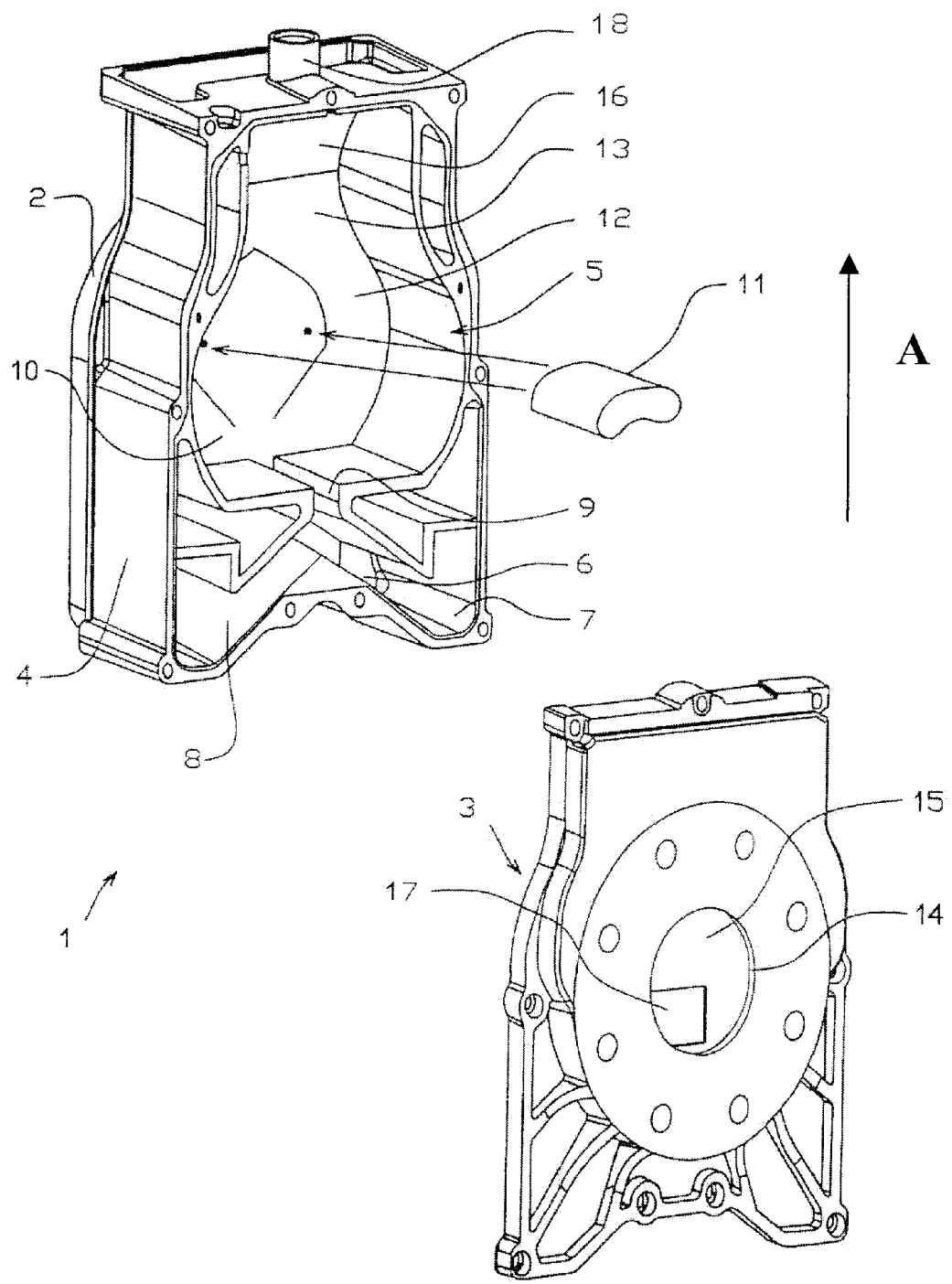
FIG. 1 shows a prior art fluidic oscillator flowmeter, in an exploded view.
Figure 2:
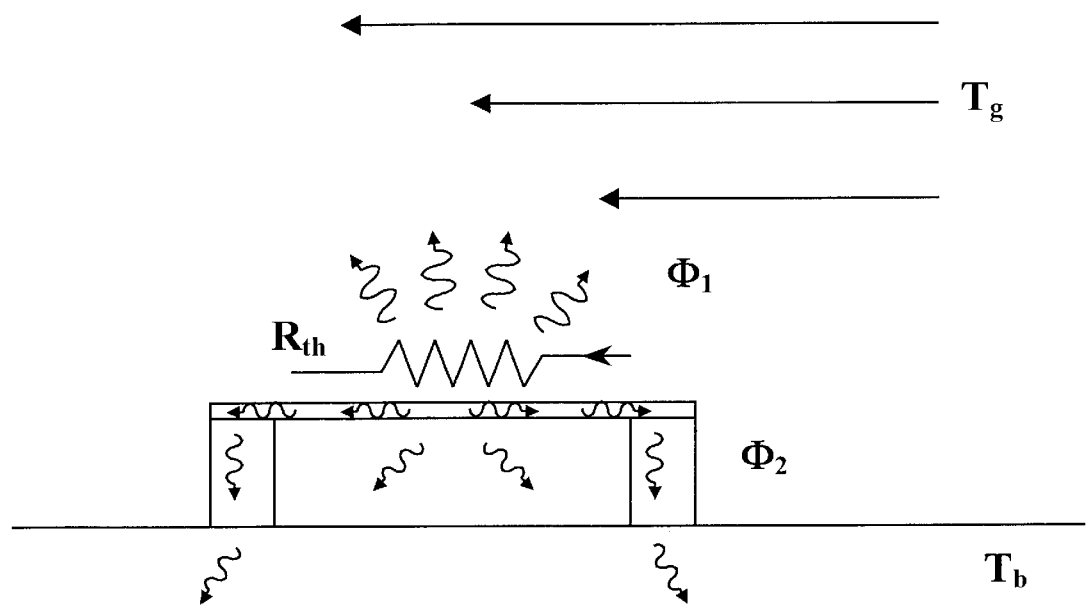
FIG. 2 is a diagram of the respective heat exchanges between the temperature sensor and both the fluid and the flowmeter body.
Figure 3:
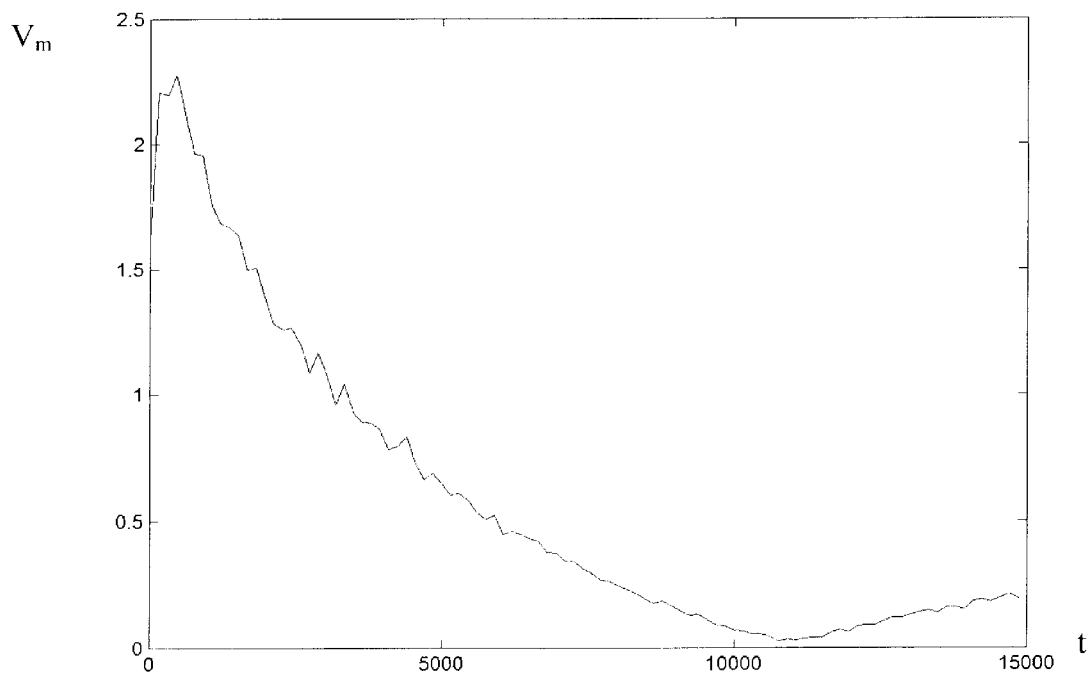
FIG. 3 is a graph showing how the component at the frequency $f$ of the output signal from the temperature sensor varies when the sensor is fed with DC during a temperature transition stage.

When the sensor is fed with AC of amplitude v, the instantaneous electrical power is given by the following expression:

$$p(t) = \frac{v^2}{R_{th}} \cos^2(\omega t)$$

where:

$R_{th}$ is the electrical resistance of the sensor; and $\omega$ is the angular frequency of the AC fed to the sensor.

It is recalled that angular frequency is related to frequency by the relationship $\omega = 2\pi \times f$. Both concepts are used interchangeably below.

Under such conditions, solving this equation gives a solution of the form $T_{th}(t) = f(p(t), K_1(t), K_2, T_{th}, T_b)$, which can be approximated by a method of perturbations which leads to a temperature response in AC mode as follows:

$$\delta T_{th}(t) = T_\omega \cos(2\omega t + \phi) + \epsilon T_{\omega A} \cos((2\omega + \omega_0)t + \phi_A) + \epsilon T_{\omega B} \cos((2\omega - \omega_0)t + \phi_B) + \epsilon T_{\omega C} \sin(\omega_0 t + \phi_C)$$

where:

$\omega_0$ is the angular frequency of the oscillating fluid jet, and where $$T_\omega = \frac{P_{ac}}{\sqrt{(K_1 + K_2)^2 + (2C\omega)^2}} \quad \text{and} \quad \sin(\varphi) = \frac{-2C\omega}{\sqrt{(K_1 + K_2)^2 + (2C\omega)^2}}$$

$$T_{\omega A} = \frac{K_1 T_\omega}{2\sqrt{C^2(2\omega + \omega_0)^2 + (K_1 + K_2)^2}} \quad \text{and} \quad \sin(\varphi'_A) = \frac{C(2\omega + \omega_0)}{\sqrt{C^2(2\omega + \omega_0)^2 + (K_1 + K_2)^2}}$$

$$\text{with} \quad \varphi_A = \varphi + \pi - \varphi'_A$$

$$T_{\omega B} = \frac{K_1 T_\omega}{2\sqrt{C^2(2\omega - \omega_0)^2 + (K_1 + K_2)^2}} \quad \text{and} \quad \sin(\varphi'_B) = \frac{C(2\omega - \omega_0)}{\sqrt{C^2(2\omega - \omega_0)^2 + (K_1 + K_2)^2}}$$

$$\text{with} \quad \varphi_B = \varphi + \pi - \varphi'_B$$

$$T_{\omega C} = \frac{K_1}{K_1 + K_2} K_2 (T_g + T_b) - \frac{P_{ac}}{\sqrt{C^2 \omega_0^2 + (K_1 + K_2)^2}} \quad \text{and} \quad \sin(\varphi_C) = \frac{-C\omega_0}{\sqrt{C^2 \omega_0^2 + (K_1 + K_2)^2}}$$

$$\text{and} \quad P_{ac} = \frac{V^2}{8R}$$

represents the electrical power dissipated in the temperature sensor.

Solution consists in using temperature components which do not cancel regardless of the oscillator temperature $T_b$ and the fluid temperature $T_g$.

To convert the temperature response into a usable electrical signal, it is possible to use a half Wheatstone bridge circuit as shown in FIG. 4. The sensor of resistance $R_{TH}$ in series with a resistor R of known resistance is biased by an AC voltage $V_p$. The measurement voltage $V_m$ is taken across the terminals of the sensor of resistance $R_{TH}$. The frequency components of this voltage are analyzed so as to determine the angular frequency $\omega_0$ of the oscillating fluid jet, or its frequency $f_0$.

FIGS. 5A and 5B show the frequency components of the output signal from the temperature sensor when it is powered with DC as in the prior art and with AC as in the invention, respectively.

When the sensor is powered with DC, frequency analysis reveals clearly only one component at $f_0$. As explained above, there exist certain temperature conditions for which this component is of zero amplitude.

Figure 6:
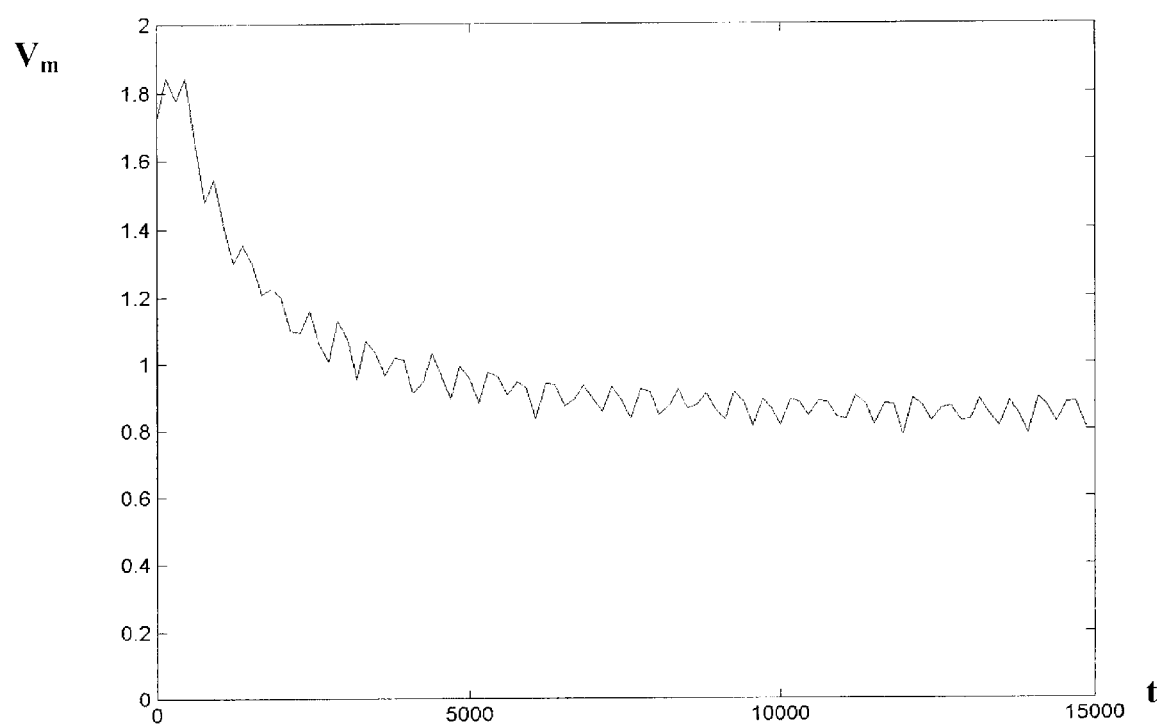
FIG. 6 shows how the frequency component at 3f in the signal output by the temperature sensor varies when the sensor is fed with AC during a temperature transition stage.

When the sensor is fed with AC, frequency analysis reveals frequency components depending on $f_0$ located at $f-f_0$, $f+f_0$, $3f-f_0$, $3f+f_0$. It has been observed (see FIG. 6) that the components at $3f-f_0$ and $3f+f_0$ never cancel out regardless of the temperature of the oscillator body $T_b$ and of the fluid jet $T_g$.

The table below gives the frequency components of the voltage output from the half Wheatstone bridge when the sensor is fed with an AC voltage.

| Components of Vm(t): | |
| --- | --- |
| $\omega - \omega_0$ | $\dfrac{\alpha_T V \varepsilon}{32}[T_{\omega C}\cos((\omega-\omega_0)t-\varphi_C)+T_{\omega B}\cos((\omega-\omega_0)t+\varphi_B)]$ |
| $\omega$ | $\dfrac{V}{2}\cos(\omega t)+\dfrac{\alpha_T P_{ac} V}{4\sqrt{(K_1+K_2)^2+(2C\omega)^2}}\cos(\omega t+\varphi)$ |
| $\omega + \omega_0$ | $\dfrac{\alpha_T V \varepsilon}{32}[T_{\omega C}\cos((\omega+\omega_0)t+\varphi_C)+T_{\omega A}\cos((\omega+\omega_0)t+\varphi_A)]$ |
| $3\omega - \omega_0$ | $\dfrac{\alpha_T V \varepsilon}{32}T_{\omega B}\cos((3\omega-\omega_0)t+\varphi_B)$ |
| $3\omega$ | $\dfrac{\alpha_T P_{ac} V}{4\sqrt{(K_1+K_2)^2+(2C\omega)^2}}\cos(3\omega t+\varphi)$ |
| $3\omega + \omega_0$ | $\dfrac{\alpha_T V \varepsilon}{32}T_{\omega A}\cos((3\omega+\omega_0)t+\varphi_A)$ | using the various parameters whose expressions are given above.

Figure 7:
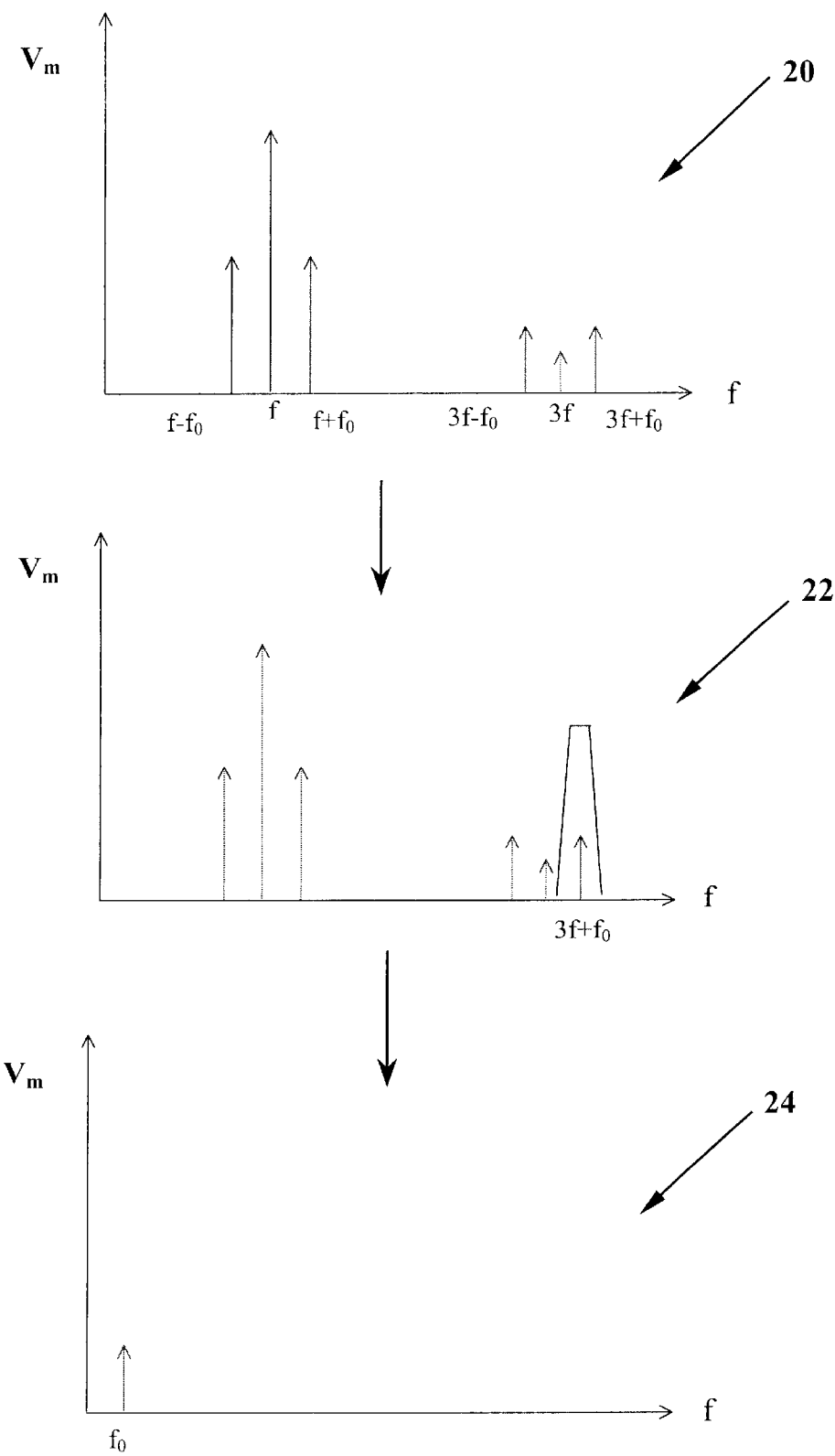
FIG. 7 is a diagram showing the various steps in a particular implementation of the method of the invention.

FIG. 7 is a diagram showing the various steps of the method in a particular implementation of the invention.

The temperature sensor is fed with an AC voltage of frequency f.

The first step 20 consists in measuring the measurement signal $V_m(t)$ across the terminals of the temperature sensor. Frequency analysis reveals frequency components depending on $f_0$ located at $f-f_0$, $f+f_0$, $3f-f_0$, $3f+f_0$.

The second step 22 consists in isolating the frequency component of $3f+f_0$, which component never cancels out whatever the temperature of the oscillator body $T_b$ and of the fluid jet $T_g$. This step is performed by synchronously demodulating the measurement signal at the frequency 3×f. In practice, the step of synchronously demodulating the measurement signal at the frequency 3×f consists in multiplying the measurement signal V(t) by cos(3×2π×f×t). This operation serves to shift the spectrum into so-called "base" band.

The third step 24 consists in determining the frequency of the demodulated measurement signal, which frequency corresponds to the oscillation frequency $f_0$ of the jet. In practice, this step is performed by counting the number of periods in the demodulated measurement signal over a given length of time.

Advantageously, prior to the step of determining the frequency of the measurement signal, the demodulated measurement signal is filtered by means of a lowpass filter so as to eliminate undesirable frequency components introduced during the synchronous demodulation step.

In the context of laboratory measurements, it should be observed that the method as a whole can be considerably simplified since under such circumstances additional calculation means are available separate from those of the flowmeter. Such calculation means enable the fast Fourier transform (FFT) of the signal measured across the terminals of the temperature sensor to be calculated. This calculation serves to isolate the various frequency components of interest, and in particular it makes it possible to determine directly the value of the angular frequency $\omega_0$ and thus of the frequency $f_0$ for the components at $3f-f_0$ and/or $3f+f_0$.

These additional calculation means can be constituted, for example, by a microcomputer whose energy consumption and size are not compatible with a self-contained and compact flowmeter which normally operates on batteries, which is why the fast Fourier transform of the measured signal can be obtained only in the context of use in a laboratory.

What is claimed is:

1. A method of measuring the oscillation frequency of a fluid jet in a fluidic oscillator using a temperature sensor whose resistance varies as a function of the oscillation frequency $f_0$ of the jet, said method comprising:

feeding the temperature sensor with an AC voltage of frequency f; and determining the frequency components around the frequency 3×f in the signal output by the temperature sensor in order to determine the oscillation frequency $f_0$ of the jet.

2. A method of measuring the oscillation frequency of a fluid jet in a fluidic oscillator using a temperature sensor in accordance with claim 1, wherein the step of determining the frequency components in the signal output by the temperature sensor includes:

measuring the resulting measurement signal V(t) across the terminals of the temperature sensor;

synchronously demodulating the measurement signal at the frequency 3×f; and determining the frequency of the demodulated measurement signal, which frequency corresponds to the oscillation frequency $f_0$ of the jet.

3. A method of measuring the oscillation frequency of a fluid jet in a fluidic oscillator using a temperature sensor in accordance with claim 2, further comprising; filtering the demodulated measurement signal with a lowpass filter before performing the step of determining the frequency of the measurement signal.

4. A method of measuring the oscillation frequency of a fluid jet in a fluidic oscillator using a temperature sensor in accordance with claim 2, wherein the step of synchronously demodulating the measurement signal at the frequency 3×f, includes: multiplying the measurement signal V(t) by cos (3×2ρ×f×t).

5. A method of measuring the oscillation frequency of a fluid jet in a fluidic oscillator using a temperature sensor in accordance with claim 1, wherein the frequency components of the output signal from the temperature sensor and the oscillation frequency $f_0$ of the jet are determined by a fast Fourier transform method.

* * * * *